US012614177B2

(12) United States Patent
Ward et al.

(10) Patent No.: US 12,614,177 B2
(45) Date of Patent: Apr. 28, 2026

(54) IDENTITY VERIFICATION PROCESS

(71) Applicant: Wells Fargo Bank, N.A., San Francisco, CA (US)

(72) Inventors: Marc Ward, Livermore, CA (US); Thomas J. Gilheany, San Jose, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 358 days.

(21) Appl. No.: 18/333,836

(22) Filed: Jun. 13, 2023

(65) Prior Publication Data

US 2024/0422145 A1    Dec. 19, 2024

(51) Int. Cl.
*G06Q 20/40* (2012.01)
*H04L 9/40* (2022.01)

(52) U.S. Cl.
CPC ......... *G06Q 20/4014* (2013.01); *H04L 63/08* (2013.01)

(58) Field of Classification Search
CPC .......................... H04L 63/08; G06Q 20/4014
See application file for complete search history.

(56) References Cited

U.S. PATENT DOCUMENTS

| | | | |
|---|---|---|---|
| 7,406,594 B2 | 7/2008 | Taruguchi | |
| 7,624,421 B2 | 11/2009 | Ozzie et al. | |
| 8,914,848 B2 | 12/2014 | Castro et al. | |
| 10,158,489 B2 * | 12/2018 | Shastri | H04L 63/0853 |
| 10,367,817 B2 | 7/2019 | Ligatti | |

| | | | |
|---|---|---|---|
| 10,387,634 B1 * | 8/2019 | Lindell | G06F 21/35 |
| 10,447,694 B2 | 10/2019 | Sun et al. | |
| 10,489,759 B2 | 11/2019 | Hessler | |
| 10,594,697 B2 | 3/2020 | Copsey | |
| 10,600,095 B2 * | 3/2020 | Ackerman | G06Q 10/0836 |
| 10,659,453 B2 | 5/2020 | Huang | |
| 11,025,439 B2 | 6/2021 | Theodore et al. | |

(Continued)

FOREIGN PATENT DOCUMENTS

| | | |
|---|---|---|
| CN | 104796265 A | 7/2015 |
| CN | 104901956 A | 9/2015 |

(Continued)

OTHER PUBLICATIONS

Office Action from U.S. Appl. No. 18/153,189 dated Aug. 17, 2023, 9 pp.

(Continued)

*Primary Examiner* — Chau Le
(74) *Attorney, Agent, or Firm* — Shumaker & Sieffert, P.A.

(57) ABSTRACT

Techniques described herein involve processes and systems for performing identity verification on a network. In one example, this disclosure describes a method that comprises receiving, by a computing system and from a requesting device, a request to perform an identity verification for a requesting user that is operating the requesting device; outputting, by the computing system and to the requesting device, code information; enabling, by the computing system, the requesting device to display a code derived from the code information; receiving, by the computing system and from a verification device, an image of another device; and determining, by the computing system and based on the image of the other device, whether the other device is the requesting device.

20 Claims, 7 Drawing Sheets

(56) References Cited

U.S. PATENT DOCUMENTS

| | | | |
|---|---|---|---|
| 11,030,331 B2 | 6/2021 | Schvey et al. | |
| 11,153,303 B2 | 10/2021 | Scruby | |
| 11,163,862 B2 | 11/2021 | Barillari et al. | |
| 11,165,771 B2 | 11/2021 | Zavesky et al. | |
| 11,189,294 B2 | 11/2021 | Sohn | |
| 11,290,324 B2 | 3/2022 | Smith et al. | |
| 2008/0148366 A1 | 6/2008 | Wahl | |
| 2012/0278155 A1* | 11/2012 | Faith | G06V 40/16 |
| | | | 705/44 |
| 2013/0269013 A1* | 10/2013 | Parry | G06F 21/316 |
| | | | 726/7 |
| 2016/0219036 A1* | 7/2016 | Devkar | H04L 9/3226 |
| 2019/0034605 A1 | 1/2019 | Wang et al. | |
| 2019/0068382 A1* | 2/2019 | Theodore | H04W 12/06 |
| 2019/0289013 A1 | 9/2019 | Makmel et al. | |
| 2019/0333016 A1* | 10/2019 | Phillips | G06K 19/06037 |
| 2020/0252205 A1 | 8/2020 | Padmanabhan | |
| 2020/0404019 A1 | 12/2020 | Drake | |
| 2021/0084063 A1 | 3/2021 | Triantafillos et al. | |
| 2021/0406893 A1* | 12/2021 | Calvert | G06Q 20/204 |
| 2022/0004617 A1* | 1/2022 | Irwin, III | G06F 21/40 |
| 2022/0086134 A1* | 3/2022 | Xie | H04L 67/141 |
| 2022/0131844 A1* | 4/2022 | Sherlock | H04L 63/105 |
| 2023/0186281 A1 | 6/2023 | Todasco et al. | |
| 2024/0013219 A1* | 1/2024 | Goetz | G06Q 20/40145 |

FOREIGN PATENT DOCUMENTS

| | | | |
|---|---|---|---|
| KR | 20200032086 A | 3/2020 | |
| WO | 2019205389 A1 | 10/2019 | |

OTHER PUBLICATIONS

U.S. Appl. No. 17/827,387, filed May 27, 2022, naming inventor Ward.

U.S. Appl. No. 63/256,495, filed Oct. 15, 2021, naming inventor Ward.

Hinojos et al., "Face Recognition Using Distributed, Mobile Computing", 2014 IEEE International Conference on Acoustics, Speech and Signal Processing, IEEE, May 4, 2014, pp. 2179-2183, URL: https://web.nmsu.edu/~pdeleon/Research/Publications/ICASSP_2014_2.pdf.

U.S. Appl. No. 18/153,189, filed Jan. 11, 2023, naming inventors Ward et al.

Alizadeh et al., "Comparative Analysis of Decentralized Identity Approaches", IEEE Access, Aug. 29, 2022, 11 pp.

Office Action from U.S. Appl. No. 18/769,680 dated Apr. 23, 2025, 36 pp.

Response to Office Action dated Apr. 23, 2025 from U.S. Appl. No. 18/769,680, filed Jul. 22, 2025, 12 pp.

Response to Office Action dated Aug. 17, 2023 from U.S. Appl. No. 18/153,189 filed Nov. 17, 2023, 12 pp.

Ahmed et al., "Blockchain-Based Identity Management System and Self-Sovereign Identity Ecosystem: A Comprehensive Survey", vol. 10, IEEE, Nov. 3, 2022, 46 pp.

Notice of Allowance from U.S. Appl. No. 18/153,189 dated Mar. 18, 2024, 13 pp.

Goodell et al., "A Decentralized Digital Identity Architecture", vol. 2, Article 17, Frontiers in Blockchain, Nov. 5, 2019, 19 pp.

Notice of Allowance from U.S. Appl. No. 18/769,680 dated Sep. 18, 2025, 14 pp.

* cited by examiner

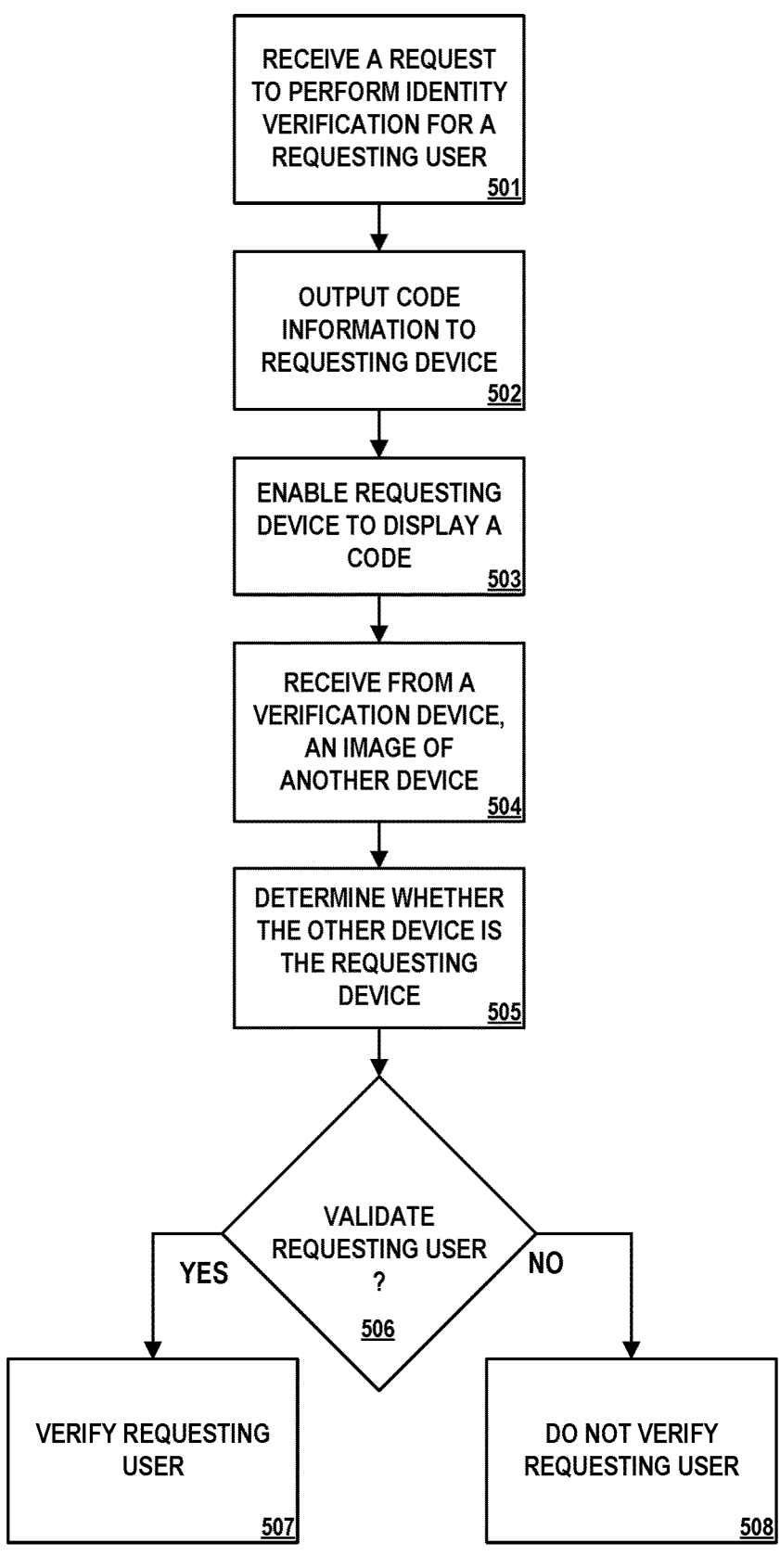

RECEIVE A REQUEST TO PERFORM IDENTITY VERIFICATION FOR A REQUESTING USER 501

OUTPUT CODE INFORMATION TO REQUESTING DEVICE 502

ENABLE REQUESTING DEVICE TO DISPLAY A CODE 503

RECEIVE FROM A VERIFICATION DEVICE, AN IMAGE OF ANOTHER DEVICE 504

DETERMINE WHETHER THE OTHER DEVICE IS THE REQUESTING DEVICE 505

VALIDATE REQUESTING USER ? 506

YES

NO

VERIFY REQUESTING USER 507

DO NOT VERIFY REQUESTING USER 508

FIG. 5

IDENTITY VERIFICATION PROCESS

TECHNICAL FIELD

This disclosure relates to computer networks, and more specifically, to techniques for validating user identity.

BACKGROUND

The value of a network of users, such as a social network, tends to depend on, or at least be enhanced by, a robust process for identifying each user's real identity. When identities used on a network are verifiable and accurate, network engagement tends to increase, leading networks to grow in size, density, and activity, and further leading to positive effects that result from network synergies. By accurately confirming the identity of each user on a network and preventing users from maintaining multiple identities, the risk of fraud, phishing, and improper influence declines. Those effects tend to serve as incentives for new users to join and participate in the network.

SUMMARY

Techniques described herein involve processes and systems for performing identity verification on a network. In some examples, two users may perform a mutual identity verification, in which each user verifies, from personal knowledge, the identity of the other user. Identity verification processes described herein may also involve blockchain-enabled interactions to collect information about whether the two users are near each other, to communicate data to each user's device, and to enable each user to capture an image of the other user. A computing system (e.g., a node executing a smart contract on a blockchain) may verify that the users are near each other and that the image captured by each user is consistent with mutual verification of both users.

In some examples, such a process may be extended to involve more than two users, with one or more of the users verifying the identity of the other users. In still other examples, the identity verification process may take place between a user and a trusted machine, where the user engages in a process that enables the trusted machine to verify the user's identity.

Processes described herein, in at least some examples, may leverage the personal knowledge and familiarity that a user has with respect to other users. An identity verification process that leverages personal knowledge, familiarity, and personal relationships creates the potential for a distributed trust to emerge over time. Such a trust will tend to root out any fraud in its earliest stages, before that fraud can be used to the detriment of other network users.

In some examples, this disclosure describes operations performed by a computing system in accordance with one or more aspects of this disclosure. In one specific example, this disclosure describes a method comprising receiving, by a computing system and from a requesting device, a request to perform an identity verification for a requesting user that is operating the requesting device; outputting, by the computing system and to the requesting device, code information; enabling, by the computing system, the requesting device to display a code derived from the code information; receiving, by the computing system and from a verification device, an image of another device; and determining, by the computing system and based on the image of the other device, whether the other device is the requesting device.

In another example, this disclosure describes a system comprising a storage system and processing circuitry having access to the storage system, wherein the processing circuitry is configured to carry out operations described herein. In yet another example, this disclosure describes a computer-readable storage medium comprising instructions that, when executed, configure processing circuitry of a computing system to carry out operations described herein.

The details of one or more examples of the disclosure are set forth in the accompanying drawings and the description herein. Other features, objects, and advantages of the disclosure will be apparent from the description and drawings, and from the claims.

BRIEF DESCRIPTION OF THE DRAWINGS

FIG. 5 is a flow diagram illustrating operations performed by an example computing system in accordance with one or more aspects of the present disclosure.

DETAILED DESCRIPTION

This disclosure describes a number of techniques to conduct identity verification and authentication, such as between two network users or between a trusted machine on the network and a user. In some examples, identity verification is based on an indication of two or more devices being in close proximity, facial recognition, and verification of images or codes generated by an external trusted system and presented by a user device. In cases where such identity verification involves two or more users, such identity verification may further be based on each user's personal knowledge of another person's identity, which may provide the basis for a belief that the other user is who he or she is purporting to be. Techniques described herein may be implemented using a consensus network and/or blockchain. Logic employed to generate codes and/or to verify users may be executed by one or more smart contracts executing on such consensus networks or blockchains.

Figure 1:
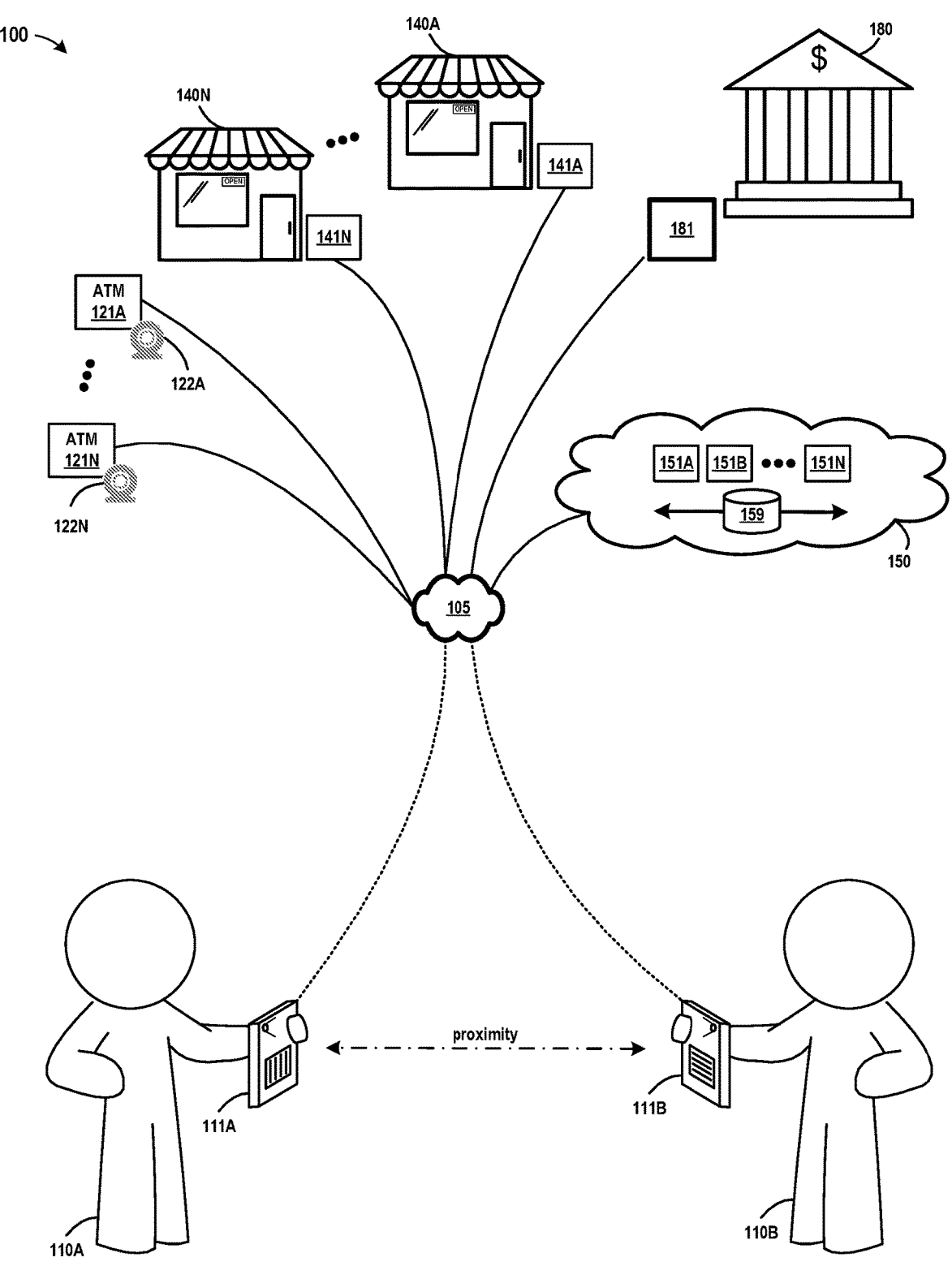
FIG. 1 is a conceptual diagram illustrating an example system in which a user may perform an identity verification, in accordance with one or more aspects of the present disclosure.

FIG. 1 is a conceptual diagram illustrating an example system in which a user may perform an identity verification, in accordance with one or more aspects of the present disclosure. In FIG. 1, transaction network 100 includes representations of a number of user devices, entities, and systems capable of communicating over network 105. For example, illustrated in transaction network 100 are users 110A and 110B, operating computing devices 111A and 111B, respectively. For ease of illustration, only two users 110A and 110B are shown in FIG. 1, but users 110A through 110N are possible (collectively, "users 110," representing any number of users). Also illustrated within transaction network 100 are merchants 140A through 140N (collectively, "merchants 140," representing any number of merchants), network administrator 180, field systems 121A through 121N (collectively, "field systems 121," representing any number of field systems 121), and consensus network 150.

Each of users 110 may operate and/or possess one or more computing devices 111. Users 110 may communicate and/or interact with other users 110 and merchants 140 (e.g., over network 105) using such computing devices 111. Network 105 serves as a communications infrastructure or platform on which transaction network 100 operates. Network 105 may be or may include or represent any public or private communications network or other network, including the internet.

Often, computing devices 111 may be mobile communications devices, such as smartphones. However, computing devices 111 may be implemented through any suitable computing system including any mobile, non-mobile, wearable, and/or non-wearable computing device, which may be a mobile phone or tablet, or a laptop or desktop computing device. In general, devices 111 may take any appropriate form, which may include a computerized watch, a computerized glove or gloves, a personal digital assistant, a virtual assistant, a gaming system, a media player, an e-book reader, a television or television platform, a bicycle, automobile, or navigation, information and/or entertainment system, or any other type of wearable, non-wearable, mobile, or non-mobile computing device that may perform operations in accordance with one or more aspects of the present disclosure.

Each of merchants 140 may be a physical, virtual, and/or online retailer or other commercial entity that provides products or services to users 110. For example, any of merchants 140 may be a grocery store, gas station, department store, specialty or other retailer, drug store, restaurant, coffee shop, medical clinic, legal or accounting services provider, transportation services provider, or any other commercial entity that maintains a physical presence. Alternatively, or in addition, any of merchants 140 may be an online or virtual commercial entity that provides products or services corresponding to or similar to those provided by a physical grocery store, gas station, department store, specialty or other retailer, drug store, restaurant, coffee shop, medical clinic, legal or accounting services provider, transportation services provider, or other commercial entity.

Merchants 140 may operate or control various computing systems, depicted generally in FIG. 1 as merchant computing systems 141A through 141N (collectively, "merchant computing systems 141"). Specifically, in FIG. 1, merchant 140A operates or controls merchant computing system 141A, and merchant 140N operates or controls merchant computing system 141N. Each of merchant computing systems 141 perform operations relating to providing goods or services to one or more users 110 over network 105 or through physical delivery of a product sold by a corresponding merchant 140. For example, each of merchant computing systems 141 may perform operations that include manifesting a web presence, taking orders, providing product support, and/or communicating with customers.

Each of merchant computing systems 141 may be implemented as any suitable computing system or collection of computing systems, including one or more server computers, workstations, mainframes, appliances, cloud computing systems, and/or other computing devices that may be capable of performing operations and/or functions described in accordance with one or more aspects of the present disclosure. In some examples, such systems may represent or be implemented through one or more virtualized compute instances (e.g., virtual machines, containers) of a data center, cloud computing system, server farm, and/or server cluster.

Network administrator 180 may be a public or private entity that administers operations on transaction network 100, monitors and maintains aspects of transaction network 100, and/or implements policies on transaction network 100 that tend to benefit users 110 and/or merchants 140. In some examples, network administrator 180 may be a bank or other financial institution, but other private or public entities could serve as network administrator 180. However, a bank or other financial institution may be an appropriate entity to serve as network administrator 180, since at least some banks and/or financial institutions tend to be well positioned (commercially, organizationally, and legally) to process transactions for merchants 140 and maintain financial accounts for users 110 in a way that facilitates operations on transaction network 100.

Network administrator 180 may operate and control a collection of computing systems for use in facilitating various network operations described herein. Such computing systems are collectively represented in FIG. 1 as network management computing system 181. Network management computing system 181 may be implemented as any suitable computing system or collection of computing systems, including one or more server computers, workstations, mainframes, appliances, cloud computing systems, and/or other computing devices that may be capable of performing operations and/or functions described in accordance with one or more aspects of the present disclosure. In some examples, such systems may represent or be implemented through one or more virtualized compute instances (e.g., virtual machines, containers) of a data center, cloud computing system, server farm, and/or server cluster.

Field systems 121 represent various physical machines or devices deployed by network administrator 180 throughout a geographic region. Often, such field systems 121 are automated teller machines ("ATMs") or kiosks that serve as automated points of presence for network administrator 180. Accordingly, in FIG. 1, field systems 121 are labeled as "ATMs," but such systems may take the form of other existing kiosks or points of presence that may be deployed within a region. Typically, such ATMs or kiosks have one or more sensors 122 (illustrated in FIG. 1 as sensor 122A associated with field system 121A, and sensor 122N associated with field system 121N). These sensors 122 may be any appropriate devices or systems, which may include cameras, microphones, biometric sensors, or other types of sensors. Each of field systems 121 may provide conventional services provided by an automated teller machine (e.g., dispensing cash, processing banking transactions). Alternatively, or in addition, each of field systems 121 may also perform other operations as described herein, particularly those relating to enabling one or more users 110 to perform identity disclosure activities (e.g., a self-disclosure process) to maintain user status on transaction network 100. Such a process may take advantage of or utilize various sensors 122 that may be incorporated into each of field systems 121. Although described herein primarily as ATMs, field systems 121 should be understood to encompass any type of physical system or physical point of presence, automated or otherwise.

Consensus network 150 includes a plurality of nodes, including node 151A through 151N (collectively "nodes 151," and representing any number of nodes). Consensus network 150 may include one or more distributed ledgers, including distributed ledger 159, which may be implemented as a data store included in multiple (or all) nodes 151 within consensus network 150. In general, each node 151 within consensus network 150 (or a significant fraction of nodes 151) includes a copy (or at least a partial copy) of distributed ledger 159 maintained by consensus network 150.

Typically, consensus network 150 is implemented as a network of computing devices (e.g., "nodes 151") that collectively maintain one or more distributed ledgers 159. Nodes 151 included within consensus network 150 may each represent any computing device capable of adhering to a consensus protocol and/or performing operations corresponding to one or more smart contracts. One or more consensus networks 150 may, for instance, represent an Ethereum network of Ethereum virtual machines (EVMs), also known as an Ethereum blockchain platform, executing on hardware computing devices. In one example, consensus network 150 might be implemented as a delegated proof of stake network, where network administrator 180 owns all the delegates and serves as a trusted source such that network administrator 180 settles all the blocks (e.g., through network management computing system 181). Consensus network 150 may be implemented in any appropriate manner, whether now known or hereinafter developed.

Distributed ledger 159 included within consensus network 150 may represent one or more shared transactional databases or data stores that include a plurality of blocks, each block (other than the root) referencing at least one block created at an earlier time, each block bundling one or more transactions registered within distributed ledger 159, and each block cryptographically secured. Consensus network 150 may receive transactions from transaction senders (e.g., computing devices external or internal to consensus network 150, such as network management computing system 181 in FIG. 1) that invoke functionality of distributed ledger 159 (or of a smart contract) to modify distributed ledger 159 stored within and maintained by consensus network 150. Consensus network 150 may use distributed ledger 159 for verification. Each block of distributed ledger 159 may contain a hash pointer as a link to a previous block, a timestamp, and the transaction data for the transactions. In a blockchain implementation, and by design, distributed ledger 159 is inherently resistant to modification of previously stored transaction data. Functionally, distributed ledger 159 serves as a ledger, distributed across many nodes of a consensus network, that can record transactions (and other information, generally) between parties efficiently and in a verifiable and permanent way. Since distributed ledger 159 is a distributed ledger, each of nodes 151 within consensus network 150 (or at least a significant fraction of nodes 151) store a copy of distributed ledger 159.

For ease of illustration, only one consensus network 150 is illustrated in FIG. 1, and within consensus network 150, one distributed ledger 159 is illustrated. However, multiple consensus networks 150 may be included within implementations corresponding to that illustrated in FIG. 1, and multiple distributed ledgers 159 might be included or implemented by one or more consensus networks 150 in a manner consistent with the techniques described herein. For example, consensus network 150 may manage multiple distributed ledgers 159. Further, each of distributed ledgers 159 might be a private distributed ledger or a public distributed ledger.

The present disclosure describes a system, network, or social network (i.e., transaction network 100) that enables knowledge to be shared amongst verified human members of the network. In transaction network 100, users 110 occasionally or periodically engage in a process of "disclosing" or "redisclosing" themselves. During such a process, network management computing system 181, operating on behalf of network administrator 180, collects and stores information about each of users 110. Network management computing system 181 establishes, based on the information, a unique self-disclosed identity (SDI) for each of users 110. Using the SDI, entities on transaction network 100 (e.g., network administrator 180 or merchants 140) can reaffirm confidence that each of users 110 performing actions on transaction network 100 is accurately identified.

The ability to accurately identify users 110 enables other entities and/or users on transaction network 100 to hold counterparties liable for contracts entered. In addition, an ability to uniquely and accurately identify users 110 also enables a network to determine the actual number of users 110 that use the network for communications, transactions, or other purposes.

In some examples, transaction network 100 may take the form of a distributed self-reinforcing network in which users 110 are incentivized to conduct distributed network reinforcing activities by performing identity disclosure activities and/or authenticating themselves to other users 110 as they go about their daily lives. As users 110 join transaction network 100, users 110 and other network actors work together to root out fraudsters that may seek to maintain multiple identities or otherwise perpetrate fraud. Such an arrangement enables network mathematics and network synergies (e.g., derived from a large number of network users) to engage, resulting in significant benefits to anyone taking part in or having an ownership stake in transaction network 100. Processes described herein may enable users 110 to effectively transport their identity through time in a trusted manner from birth until death.

In some examples, transaction network 100 may operate based on a "ringed-layered" approach to identity management. In such an approach, users 110 are incentivized to self-disclose their identity to network administrator 180 (e.g., through network management computing system 181). The incentive for users 110 to engage in such a self-disclosure process to network administrator 180 may be a commitment (e.g., by network administrator 180) to compensate users 110 for such self-disclosure and/or for maintaining membership status on transaction network 100. For example, network administrator 180 may collect transaction fees for transactions taking place on transaction network 100, and the network administrator 180 may agree to compensate users 110 by distributing to each user 110 a share of those transaction fees. In some examples, such compensation may be structured as a yield paid to users 110 based on users' membership status and/or membership tenure on transaction network 100. Compensation may take any appropriate form, including through distribution of a finite cryptocurrency. In some examples, the cryptocurrency may produce a yield based upon the transaction fees collected in exogenous currencies.

Accordingly, each of users 110 may be expected (or motivated) to maintain their identity (SDI) and/or membership status. Over time, if a user takes no actions to maintain or authenticate themselves, then the yield that would otherwise be distributed to that user from network administrator 180 (i.e., based on a promise to pay a share of transaction fees) may be reduced after a short period of time (e.g., removed from the user's wallet) and may eventually progress to not being distributed at all. Eventually, if no self-disclosed authentication takes place for a given user 110, network administrator 180 might conduct a death investigation to determine if that user 110 is deceased (which may necessitate adjudicating disposition of that user's assets according to law).

A human identity can be defined based on a biometric signature of a given user 110. Such a signature may take the form of a brain/blood/heart combination. In such a combination, "brain" information might correspond to a video of an identifiable user 110, "blood" information might correspond to information derived from a DNA sample taken from the user, and "heart" information might correspond to a signature of information derived from that user's heart vibrations. A user's biometric signature may take other forms, of course, and may be based on other types of biometric information. For example, each user 110 has various vibrations and speaking patterns, and unique fingerprints and retina patterns.

Further aspects of such a distributed self-reinforcing network, as well as other concepts, are described in U.S. patent application Ser. No. 18/153,189, filed Jan. 11, 2023 (entitled "Self-Disclosed Identity on a Network"), which is hereby fully incorporated by reference.

There are many potential methods through which a user 110 may perform an identity disclosure activity and thereby maintain an identity. For example, users 110 can disclose or redisclose their identity to a human agent of network administrator 180, or to a network member that performs such verifications as a service. Or users 110 may interact with one or more field systems 121. In another example, users 110 may engage in transactions (e.g., purchases from any of merchants 140) in which their identity is reaffirmed. And in yet another example, users 110 can engage in a mutual self-disclosure process with another user 110.

As described herein, users 110A and 110B may perform a mutual identity verification process, which may involve each of users 110A and 110B personally vouching for the other user being who they purport to be. Such a mutual identity verification process tends to work better, therefore, when users 110A and 110B know each other. If users 110A and 110B do not know each other sufficiently, one or both of such users may refuse to engage in a mutual identity verification process with the other user, for fear that the verification process may be unsuccessful, which may detrimentally affect each user's status on the network.

In an example that that can be described in the context of FIG. 1, and in accordance with one or more aspects of the present disclosure, computing devices 111A and IIIB may initiate a mutual identity verification process to be carried out by users 110A and 110B. For instance, computing device 111A detects input that computing device 111A determines corresponds to a request, by user 110A, to perform a mutual identity verification process with user 110B. At about the same time, computing device IIIB detects input that computing device IIIB determines corresponds to a request, by user 110B, to perform a mutual identity process with user 110A. In response, computing device 111A outputs a signal over network 105. Network management computing system

181 detects the signal over network 105 and determines that it corresponds to a request, by user 110A, to perform a verification process with user 110B. Similarly, computing device IIIB outputs a signal over network 105 that network management computing system 181 determines corresponds to a request, by user 110B, to perform a verification process with user 110A.

Network management computing system 181 may communicate with each of computing devices 111A and 111B. For instance, continuing with the example being described in the context of FIG. 1, network management computing system 181 outputs a series of signals over network 105. Computing device 111A detects one set of signals over 105 and determines that the signals include audio information and a secret code. Computing device 111B detects a different set of signals over 105 and determines that the signals include different audio information and a different secret code.

Computing devices 111A and 111B may collect information enabling a proximity assessment (i.e., an assessment of how close the devices are to each other). For instance, still referring to FIG. 1, computing device 111A outputs an audio sound derived from the audio information it received from network management computing system 181. Normally, the sound would not be perceptible to any other device that is not near computing device 111A. Similarly, computing device 111B may also output a barely perceptible audio sound, which may be derived from the audio information computing device 111B received from network management computing system 181 (see arrow labeled "proximity"). Normally the sounds are different. Each of computing devices 111A and 111B store information about any audio sounds detected (i.e., as a result of the other computing device 111 outputting an audio sound). In some examples, the stored information can be used to confirm that computing devices 111A and 111B are near each other. As described further herein, other techniques may be used to confirm that computing devices 111A and 110B are near each other.

Computing devices 111A and 111B may each capture an image of the other user. For instance, again referring to the example being described in the context of FIG. 1, computing device 111A presents the code received from network management computing system 181 on a display associated with computing device 111A. Similarly, computing device 111B presents the code that it received from network management computing system 181 on a display associated with computing device 111B. Users 110A and 110B hold the devices so each is visible to the other user. Accordingly, as shown in FIG. 1, users 110A and 110B are holding computing devices 111A and 111B, respectively, while at the same time displaying the code received from network management computing system 181 to the other user. Normally, the codes presented by each of computing devices 111A and 111B are different, unique, and/or secret. At this point, each of computing devices 111A and 111B capture an image of the other user 110 holding a computing device 111 (e.g., computing devices 111A and 111B may capture the image in response to user input).

Computing devices 111A and 111B may communicate the images to network management computing systems 181 for verification. For instance, again with reference to FIG. 1, computing device 111A outputs the image of user 110B over network 105 to network management computing system 181. Similarly, computing device 111B outputs the image of user 110A over network 105 to network management computing system 181. Network management computing system 181 receives the images and verifies that each image includes an image of the appropriate user and the code that was previously sent to the other device. In other words, network management computing system 181 confirms that the image received from user 110A shows user 110B holding computing device 111B, with the code previously sent to computing device 111B being displayed by computing device 111B. Similarly, network management computing system 181 confirms that the image received from user 110B shows user 110A holding computing device 111A, with the code previously sent to computing device 111A being displayed by computing device 111A. To confirm that the user shown in each image is the correct user, computing system 281 may perform facial recognition analysis. To confirm that the codes shown in each image are correct, computing system 281 may analyze the portions of the image in which the codes are displayed by the computing devices 111 held by the users.

Network management computing system 181 may determine whether the mutual identity verification process was completed successfully. For instance, once again with reference to FIG. 1, computing system 181 evaluates the information received from computing devices 111A and 111B. If computing system 181 determines that users 110A and 110B are not near each other, are not identifiable in the images, or that the codes are not correct, computing system 181 may determine that the mutual verification process was not successful. However, if computing system 181 is able to confirm each of those items, computing system 181 may confirm that the mutual verification process was completed successfully.

Techniques described herein may provide certain technical advantages. For instance, leveraging users' personal knowledge when mutual identity verifications are performed will tend to limit the scope of fraud, and prevent unwitting users from participating in any fraud occurring on the network. Users seeking to perpetuate fraud (e.g., by using a fake identity) will likely have to conspire with others that also seek to perpetuate fraud. And to the extent that the network requires each user to frequently perform identity verifications by engaging with different people each time, a person seeking to perpetuate fraud will need to attempt to continually widen the group of conspirators, which is more likely to lead to the fraud being uncovered than perpetuated.

Further, a mutual verification process that involves additional safeguards beyond each user's personal identity verification, as described herein, makes the verification process very robust and difficult to defeat. For example, where such safeguards involve a different smart contract-generated secret message or code being communicated to each user's device, with each user capturing an image of the code (along with an image of the other user's face), the overall process will be very secure. Such a process will be difficult to simulate or otherwise mimic in a way that will allow fraudulent verifications to be performed.

Further, although techniques described herein may be applied in the context of verifying identities for use on a specific network, other uses of the techniques are possible. Processes described herein may be used as part of a process for performing a transaction, such as at a point-of-sale location when a user is purchasing goods or services from a merchant. Processes described herein may also be used to prove that a given user was at a specific location at a specific point in time. Such proof may be useful when verifying residency status, or when investigating or assessing whether payment card fraud has occurred. Such proof may be useful for other purposes, such as simply enabling a user to recall where he or she was on a given day, for providing information for an insurance claim, or even for providing proof that supports an alibi.

Figure 2A:
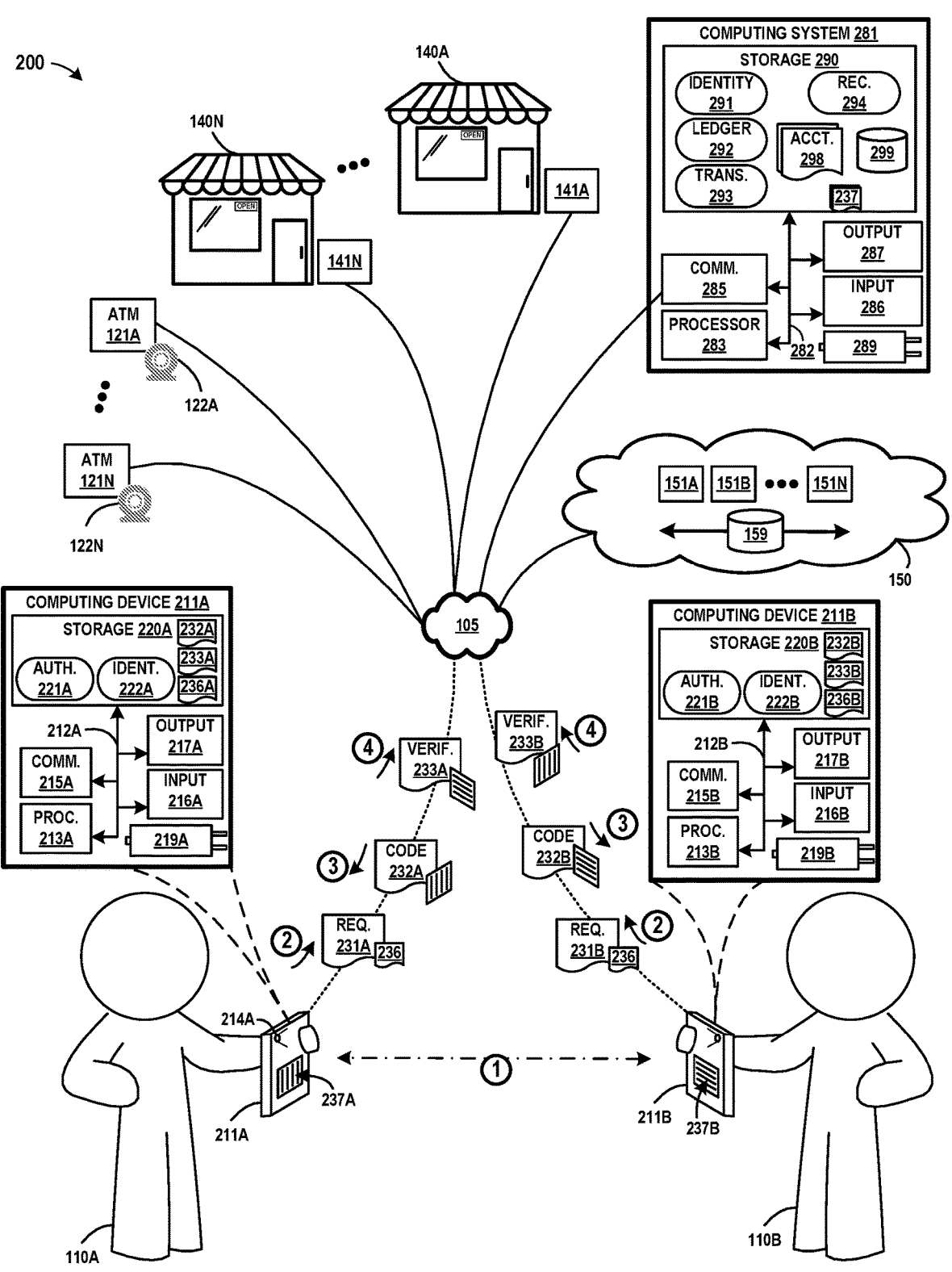
FIG. 2A is a conceptual diagram illustrating an example system in which two users perform a mutual identity verification, in accordance with one or more aspects of the present disclosure.

FIG. 2A is a conceptual diagram illustrating an example system in which two users perform a mutual identity verification, in accordance with one or more aspects of the present disclosure. As described herein, computing devices 211A and 211B (operated by users 110A and 110B, respectively) may, in order to perform the mutual identity verification, communicate with each other and communicate with computing system 281. The information that computing devices 211 communicate with computing system 281 may include certain verification information 233.

Figure 2B:
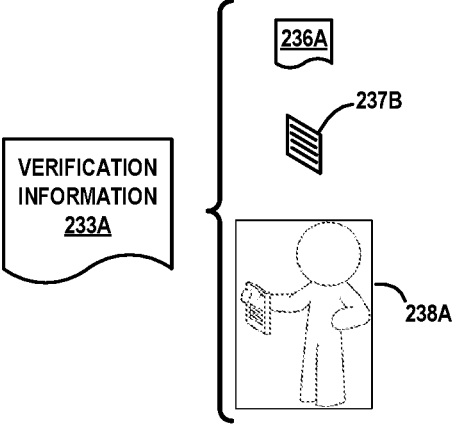
FIG. 2B is a conceptual diagram illustrating further detail about certain information that each user's computing device communicates over a network, in accordance with one or more aspects of the present disclosure.
Figure 2B:
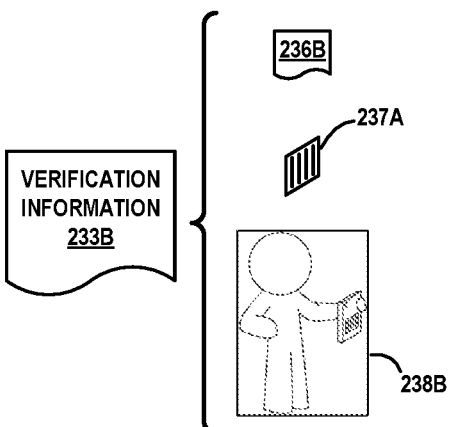

FIG. 2B is a conceptual diagram illustrating further detail about certain information that each user's computing device communicates over a network, in accordance with one or more aspects of the present disclosure. Specifically, FIG. 2B illustrates components of verification information 233. Each of computing devices 211A and 211B communicate an instance of verification information 233 (verification information 233A and verification information 233B, respectively) to computing system 281, as further described herein.

FIG. 2A is similar to FIG. 1, and includes many of the same elements illustrated in FIG. 1. In FIG. 2A, computing system 281 may correspond to, or may represent an example of network management computing system 181 of FIG. 1. Similarly, computing devices 211 may correspond to, or may represent examples of computing devices 111 of FIG. 1. Other elements illustrated in FIG. 2A may be illustrated with the same reference number as corresponding elements of FIG. 1, and in general, like-numbered elements illustrated in FIG. 2A correspond to elements similarly illustrated and numbered in FIG. 1.

Computing system 281 is illustrated in FIG. 2A as a block diagram with specific components and data modules. For ease of illustration, computing system 281 is depicted in FIG. 2A as a single computing system. However, in other examples, computing system 281 may comprise multiple devices or systems, such as systems distributed across a data center or multiple data centers. For example, separate computing systems may implement functionality performed by each of identity module 291, ledger module 292, transaction module 293, and recommendation module 294. Alternatively, or in addition, computing system 281 (or various modules illustrated in FIG. 2A as included within computing system 281) may be implemented through distributed virtualized compute instances (e.g., virtual machines, containers) of a data center, cloud computing system, server farm, and/or server cluster.

In some examples, some or all aspects of computing system 281 may be implemented as one or more nodes 151 on consensus network 150. Although illustrated as a separate system, computing system 281 may be a node on consensus network 150, or aspects of computing system 281 may implemented by one or more nodes 151 of consensus network 150. In other examples, computing system 281 may be a computing system capable of interacting with nodes 151 of consensus network 150 and thereby update distributed ledger 159 maintained by consensus network 150.

In FIG. 2A, computing system 281 is illustrated as including underlying physical hardware that includes power source 289, one or more processors 283, one or more communication units 285, one or more input devices 286, one or more output devices 287, and one or more storage devices 290. Storage devices 290 may include user identity module 291, ledger module 292, transaction module 293, and recommendation module 294. One or more of the devices, modules, storage areas, or other components of computing system 281 may be interconnected to enable inter-component communications (physically, communicatively, and/or operatively). In some examples, such connectivity may be provided by through communication channels, which may include a system bus (e.g., communication channel 282), a network connection, an inter-process communication data structure, or any other method for communicating data.

Power source 289 of computing system 281 may provide power to one or more components of computing system 281. One or more processors 283 of computing system 281 may implement functionality and/or execute instructions associated with computing system 281 or associated with one or more modules illustrated herein and/or described below. One or more processors 283 may be, may be part of, and/or may include processing circuitry that performs operations in accordance with one or more aspects of the present disclosure. One or more communication units 285 of computing system 281 may communicate with devices external to computing system 281 by transmitting and/or receiving data, and may operate, in some respects, as both an input device and an output device. In some or all cases, communication unit 285 may communicate with other devices or computing systems over network 105 or over other networks.

One or more input devices 286 may represent any input devices of computing system 281 not otherwise separately described herein, and one or more output devices 287 may represent any output devices of computing system 281 not otherwise separately described herein. Input devices 286 and/or output devices 287 may generate, receive, and/or process output from any type of device capable of outputting information to a human or machine. For example, one or more input devices 286 may generate, receive, and/or process input in the form of electrical, physical, audio, image, and/or visual input (e.g., peripheral device, keyboard, microphone, camera). Correspondingly, one or more output devices 287 may generate, receive, and/or process output in the form of electrical and/or physical output (e.g., peripheral device, actuator).

One or more storage devices 290 within computing system 281 may store information for processing during operation of computing system 281. Storage devices 290 may store program instructions and/or data associated with one or more of the modules described in accordance with one or more aspects of this disclosure. One or more processors 283 and one or more storage devices 290 may provide an operating environment or platform for such modules, which may be implemented as software, but may in some examples include any combination of hardware, firmware, and software. One or more processors 283 may execute instructions and one or more storage devices 290 may store instructions and/or data of one or more modules. The combination of processors 283 and storage devices 290 may retrieve, store, and/or execute the instructions and/or data of one or more applications, modules, or software. Processors 283 and/or storage devices 290 may also be operably coupled to one or more other software and/or hardware components, including, but not limited to, one or more of the components of computing system 281 and/or one or more devices or systems illustrated or described as being connected to computing system 281.

Data store 299 of computing system 281 may represent any suitable data structure or storage medium for storing information relating to accounts maintained for users 110, biometric and other information associated with users 110, information about transactions taking place on transaction network 200, and other information pertaining to the administration of transaction network 200 of FIG. 2A or aspects of transaction network 200. The information stored in data store 299 may be searchable and/or categorized such that one or more modules within computing system 281 may provide an input requesting information from data store 299, and in response to the input, receive information stored within data store 299. Data store 299 may be primarily maintained by identity module 291.

User identity module 291 may perform functions relating to collecting information received from any of computing devices 111 pursuant to a self-disclosure process and/or verifying any information received for the purpose of identifying a user (e.g., as part of a mutual verification process or from any of merchants 140 for a proposed transaction). Ledger module 292 may perform functions relating to interacting with or monitoring consensus network 150 or any other consensus network included within or used by transaction network 200. Transaction module 293 may perform functions relating to processing any of transactions taking place on transaction network 200, such as transactions between any of users 110 and any of merchants 140 or between any number of users 110. Recommendation module 294 may perform functions relating to analyzing historical transactions (e.g., stored in data store 299) and generating recommendations for any of users 110 for a proposed transaction. In some examples, recommendation module 294 may apply a machine learning model and/or artificial neural network to make predictions as to recommendations that have a high likelihood of being acted upon by one or more users 110.

Each of computing devices 211A and 211B are illustrated in FIG. 2A as a block diagram with specific components and data modules. For ease of illustration, only two computing devices 211 are shown in FIG. 2A. However, other computing devices 211 could be illustrated in a similar way. The following description of components and data modules included within computing device 211A may also apply to computing device 211B, or in general, to any of computing devices 111 in FIG. 1 or other user computing devices illustrated herein.

As illustrated in FIG. 2A, computing device 211A includes power source 219A, one or more processors 213A, one or more communication units 215A, one or more input devices 216A, one or more output devices 217A, and one or more storage devices 220A. Input devices 216 may include a camera, such as camera 214A illustrated in FIG. 2A as associated with computing device 211A. Camera 214A (or other cameras) may be used for facial recognition (e.g., recognizing facial features of user 110A). Other computing devices 211 may also include one or more cameras 214. Input devices 216 may also include, without limitation, a fingerprint reader (e.g., for thumbprint verification), a gyrometer (e.g., for detecting physical bumps or collisions with other computing devices 211), a keypad (e.g., for passcode entry), or any other appropriate device for collecting input. Input devices 216 may include 214A. Output devices 217A may include a display device (e.g., for displaying information included within verification information 233A), an audio output device (a speaker for generating a sound, which may include a subsonic sound that might or might not be capable of being heard by a human user).

Storage devices 220A may include authentication module 221A, identity module 222A, code information 232A, verification information 233A, and proximity information 236A. In some examples, identity module 222A might be part of another application or mobile device app, such as a banking application. In other examples, identity module 222A might be a stand-alone module that operates independently in at least some respects.

One or more of the devices, modules, storage areas, or other components of computing device 211A may be interconnected to enable inter-component communications (physically, communicatively, and/or operatively). In some examples, such connectivity may be provided through communication channels, which may include a system bus (e.g., communication channel 212A), a network connection, an inter-process communication data structure, or any other method for communicating data.

In an example that can be described in the context of FIG. 2A, and in accordance with one or more aspects of the present disclosure, computing device 211A may authenticate user 110A to use computing device 211A. For instance, input device 216A of computing device 211A detects input and outputs an indication of input to authentication module 221A. Authentication module 221A determines that the input corresponds to a request by a user to authenticate and/or unlock computing device 211A for use. Authentication module 221A further determines that the input can be used to verify that user 110A is authorized to use authentication module 221A. In some examples, the input detected by input device 216A may correspond to an image of the face of user 110A (i.e., for facial recognition), a thumbprint of user 110A, a password or passcode associated with user 110A, or some other information that can verify that user 110A is authorized to use computing device 211A.

Similarly, computing device 211B may authenticate user 110B to use computing device 211B. For instance, input device 216B of computing device 211B detects input and outputs an indication of input to authentication module 221B. Authentication module 221B determines that the input corresponds to a request by a user to authenticate and/or unlock computing device 211B for use. Authentication module 221B further determines that the input can be used to verify that user 110B is authorized to use authentication module 221B.

Computing device 211A may determine that user 110A seeks to perform an identity verification with user 110B. For instance, continuing with the example being described in the context of FIG. 2A, input device 216A of computing device 211A detects input and outputs an indication of input to identity module 222A. Identity module 222A determines that the input corresponds to a request, by a user of computing device 211A, to perform an identity verification (e.g., a mutual identity verification) with another user. In some examples, the request may be received by computing device 211A in response to an indication of input caused by user 110A selecting a "verification" option in a mobile device application corresponding to identity module 222A. Such an application may be a dedicated network verification application, or may be a feature or option provided by another mobile device application, such as a banking application. In some examples, the request detected by identity module 222A does not specifically identify the other user, which in the example being described with reference FIG. 2A, is user 110B. In other examples, however, the request may identify the other user 110B in some way.

Similarly, computing device 211B may determine that user 110B seeks to perform an identity verification with user 110A. For instance, again continuing with the example being described in the context of FIG. 2A, input device 216B of computing device 211B detects input and outputs an indication of input to identity module 222B. Identity module 222B determines that the input corresponds to a request, by a user of computing device 211B, to perform an identity verification (e.g., a mutual identity verification) with another user, which in the example being described, is user 110A.

Computing device 211A and computing device 211B may interact to generate information about whether computing devices 211A and 211B are near each other (e.g., a proximity assessment). For instance, referring again to the example being described in the context of FIG. 2A, output device 217A of computing device 211A outputs an audio signal (see arrow labeled "1" in FIG. 2A). In some examples, the audio signal may be a subsonic audio signal that might not be audible to humans. If computing device 211B is sufficiently close to output device 217A of computing device 211A, input device 216B of computing device 211B may detect the audio signal and store information about the signal as proximity information 236B. While proximity information 236B in this example might not necessarily indicate the distance between computing device 211A and computing device 211B, the strength or even the existence of any audio signal captured by computing device 211B may be useful in an analysis of whether computing devices 211A and 211B are close to each other. In some examples, only one of computing device 211A or computing device 211B outputs such an audio signal. In other examples, each of computing devices 211A and 211B output an audio signal to be captured by the other device and stored in storage device 220A and/or storage device 220B (e.g., as proximity information 236A or 236B). In such an example, proximity information 236 captured by both computing devices 211 may be used in an analysis of whether computing devices 211A and 211B are near each other. Further, the information used to generate the audio signal could be received by computing devices 211A or 211B from computing system 281 or any of nodes 151 on consensus network 150 (e.g., as a result of a smart contract process). In such an example, the audio signal may change each time, making the process of collecting proximity information different for each set of device interactions.

Other techniques may be used to generate proximity information 236 for use in performing a proximity assessment. For example, computing devices 211A and 211B may exchange Bluetooth tokens or Bluetooth certificates over Bluetooth protocols. Normally, exchanging information over Bluetooth protocols requires that devices are in relatively close range. In another example, computing devices 211A and 211B may be physically brought together, perhaps bumping each other, to thereby enable a physical sensor (e.g., accelerometer or gyrometer included within each of computing devices 211) to detect an impact. Each of computing devices 211A and computing device 211B may store respective information about the impact (e.g., an impact signature) as proximity information 236A and proximity information 236B. Proximity information 236A and 236B may be later compared (e.g., by computing system 281) to determine whether the impact signatures are consistent with computing devices 211A and 211B bumping each other.

Computing system 281 may determine that user 110A seeks to perform an identity verification with user 110B. For instance, again with reference to the example being described in the context of FIG. 2A, and responsive to computing device 211A determining that user 110A seeks to perform an identity verification, identity module 222A causes communication unit 215A of computing device 211A to output request 231A over network 105 (see arrow labeled "2" leaving computing device 211A in FIG. 2A). In some examples, request 231A includes any proximity information 236A captured, detected, or otherwise collected by computing device 211A. Communication unit 285 of computing system 281 detects one or more signals over network 105 and outputs an indication of the signal to identity module 291. Identity module 291 determines that the signal(s) correspond to a request, by a user of computing device 211A, to initiate an identity verification. Identity module 291 may also determine that the signal(s) indicate that the user of computing device 211A has been properly authenticated locally by computing device 211A (e.g., user 110A unlocked computing device 211A through facial recognition, thumb-print verification, passcode, or in some other way). In some examples, identity module 291 may also determine, based on the signal(s) received from computing device 211A, the purported identity of another user with whom user 110A seeks perform the mutual identity verification. In the example being described, that other user is user 110B.

At around the same time (e.g., concurrently or soon thereafter), computing system 281 may also determine that user 110B seeks to perform an identity verification with user 110A. For instance, again with reference to the example being described in the context of FIG. 2A, and responsive to computing device 211B determining that user 110B seeks to perform an identity verification, identity module 222B causes communication unit 215B of computing device 211B to output request 231B over network 105 (see arrow labeled "2" leaving computing device 211B in FIG. 2A). Communication unit 285 of computing system 281 detects one or more signals over network 105 and outputs an indication of the signal to identity module 291. Identity module 291 determines that the signal(s) correspond to a request, by a user of computing device 211_i_, to initiate an identity verification. Identity module 291 may also determine that the signal(s) indicate that the user of computing device 211B has been properly authenticated locally by computing device 211B. Identity module 291 may also determine, based on the signal(s) received from computing device 211B, the purported identity of another user with whom user 110B seeks perform the mutual identity verification (i.e., user 110A).

Computing system 281 may evaluate requests 231A and 231B. For instance, continuing with the example being described and with reference to FIG. 2A, identity module 291 compares request 231A and request 231B to determine whether they are consistent with a mutual identity verification for users 110A and 110B. In other words, this may mean that request 231A identifies user 110B as the proposed identity verification partner for user 110A, and request 231B identifies user 110A as the proposed identity verification partner for user 110B. Alternatively, or in addition, this may mean that requests request 231A and 231B were received at approximately the same time, and proximity information 236 (i.e., proximity information 236A or 236B) included within at least one of the requests 231 is sufficient to identify the two users as user 110A and user 110B. Accordingly, identity module 291 may evaluate proximity information 236A and/or 236B included with requests 231A or 231B. Such an evaluation may involve determining whether either of computing devices 211A or 211B detected an audio signal or Bluetooth signal consistent with computing device 211A and computing device 211B being near each other. Alternatively, or in addition, identity module 291 may also evaluate any proximity information 236 in the form of impact signatures that were included within requests 231A and 232B. In such an example, identity module 291 may determine whether such signatures are consistent with computing devices 211A and 211B coming in physical contact with each other (e.g., consistent impact signatures, identical time-stamps).

Computing system 281 may, in some cases, refuse the request by users 110A and 110B to perform a mutual identity verification. For instance, identity module 291 may determine that requests 231 are not consistent or there is insufficient indication that computing devices 211A and 211B are near each other. Alternatively, or in addition, identity module 291 may determine that requests 231A and 231B do not properly identify the other user. In such an example, identity module 291 may cause communication unit 285 to communicate with each of computing device 211A and computing device 211B over network 105, providing information about the refusal of requests 231A and 231B. In some examples, the information may include an explanation of why requests 231A and 231B were refused.

Computing system 281 may, in other cases, accept the request by users 110A and 110B to perform a mutual identify verification. For instance, identity module 291 may determine that requests 231A and 231B are consistent and that there is sufficient evidence that computing devices 211A and 211B are near each other. In such an example, identity module 291 may enable users 110A and 110B to proceed with their attempt to perform a mutual identity verification using computing devices 211A and computing device 211B.

In an example where computing system 281 accepts the request by users 110A and 110B to perform a mutual identity verification, computing system 281 may send information to computing device 211A to be used in the identity verification process. For instance, again referring to the example being described in the context of FIG. 2A, identity module 291 generates one or more secret codes 237, each of which may be an image, a text string, a computer-readable code (e.g., a QR code). While in some examples, each of secret codes 237 may be an image, other forms of secret code 237 are possible, including an animation, video, or sequence of images. Typically, each of secret codes 237 is "secret" in the sense that it has some element of randomness, and would be difficult for another system to predict specifics about the code before it is generated by identity module 291. Alternatively, or in addition, each of secret codes 237 may be generated as part of a smart contract process executing on nodes 151 of consensus network 150, thereby tending to ensure that each secret code 237 would not be known in advance by computing devices 211A or 211B (or by any of computing devices 211). In some examples, each of secret codes 237 generated by computing system 281 may be time-limited, so that they can only be used for a certain period of time, and thereafter are ineffective for successfully performing a mutual identity verification. Identity module 291 generates code information 232A that includes one or more secret codes, including secret code 237A. Identity module 291 causes communication unit 285 to output, over network 105, a signal that includes code information 232A (see arrow labeled "3" heading to computing device 211A in FIG. 2A). Communication unit 215A of computing device 211A detects a signal over network 105 and outputs information about the signal to identity module 222A. Identity module 222A determines that the signal corresponds to code information 232A. Identity module 222A further determines that the signal includes secret code 237A. Identity module 222A stores code information 232A within storage device 220A.

At around the same time, or concurrently, computing system 281 may send information to computing device 211B to be used in the identity verification process. For instance, still referring to the example being described in the context of FIG. 2A, identity module 291 generates one or more additional secret codes 237. Identity module 291 generates code information 232B that includes secret code 237B, which is normally different than secret code 237A. Identity module 291 causes communication unit 285 to output, over network 105, a signal that includes code information 232B (see arrow labeled "3" heading to computing device 211B in FIG. 2A). Communication unit 215B of computing device 211B detects a signal over network 105 and outputs information about the signal to identity module 222B. Identity module 222B determines that the signal corresponds to code information 232B. Identity module 222B further determines that the signal includes secret code 237B. Identity module 222B stores code information 232B within storage device 220B.

Computing devices 211A and 211B may present secret codes 237A and 237B, respectively, when engaging in a mutual identity verification process. For instance, continuing with the example being described with reference to FIG. 2A, identity module 222A of computing device 211A accesses secret code 237A within storage device 220A (secret code 237A is included within code information 232A). Identity module 222A causes one or more of output devices 217A to present secret code 237A to user 110B. In the example being described, secret code 237A is an image or other visual data, and output devices 217A of computing device 211A include a display device. The display output device 217A presents secret code 237A to user 110B by visually displaying secret code 237A, perhaps as a result of user input detected by computing device 211A. If user 110A holds computing device 211A so that user 110B can see the display, such as is illustrated in FIG. 2A, secret code 237A may be considered to be presented to user 110B. Computing system 281 may enable the requesting device (e.g., computing device 211A) to display code 237A derived from the code information 232A in any of a number of ways, including by sending a command to computing device 211A, by sending to computing device 211A instructions for execution by computing device 211A, by prior configuration (i.e., so that computing device 211A knows to display code 237A when received from 281), by not preventing computing device 211A from presenting display code 237A, or in another way.

Similarly, identity module 222B of computing device 211B accesses secret code 237B within storage device 220B (secret code 237B is included within code information 232B). For instance, identity module 222B causes a display output device 217B to present secret code 237B to user 110A. Again, in the example being described, secret code 237B is an image, and output device 217B is assumed to be a display device. If user 110B holds computing device 211B appropriately, output device 217B will enable user 110A to view secret code 237B, as is illustrated in FIG. 2A.

Each of computing devices 211A and 211B may capture an image or sequence of images that include the secret code 237 being presented by the other computing device. For instance, still continuing with the example, identity module 222A causes an image sensor included within computing device 211A (one of input devices 216A, such as camera 214A) to capture an image (or sequence of images) of user 110B holding computing device 211B while secret code 237B is visible on the display of computing device 211B. Similarly, identity module 222B causes an image sensor included within computing device 211B (one of input devices 216B) to capture an image (or sequence of images) of user 110A holding computing device 211A while secret code 237A is visible on the display of computing device 211A. In each case, the images may be captured as a result of each computing device 211 detecting user input that it interprets as a command to capture an image.

Each of computing devices 211A and 211B may send the captured information to computing system 281. For instance, identity module 222A of computing device 211A generates verification information 233A that includes the image of user 110B holding computing device 211B while secret code 237B is visible (see user image 238A in FIG. 2B). Identity module 222A causes communication unit 215A to output a signal including verification information 233A over network 105 (see arrow labeled "4" leaving computing device 211A in FIG. 2A). Similarly, identity module 222B generates verification information 233B that includes the image of user 110A holding computing device 211A while secret code 237A is visible (see user image 238B in FIG. 2B). Identity module 222B of computing device 211B causes communication unit 215B to output a signal including verification information 233B over network 105 (see arrow labeled "4" leaving computing device 211B in FIG. 2A).

FIG. 2B illustrates one possible example of the type of information that may be included within each instance of verification information 233. As shown in FIG. 2B, for example, verification information 233A may include proximity information 236A, an image of secret code 237B, and user image 238A (e.g., showing user 110B holding a device that displays secret code 237B). Proximity information 236A might not be included within verification information 233A if proximity information 236A was already included within request 231A. User image 238A includes an image of user 110B, which can be used to identify user 110B (e.g., using facial recognition analysis). In some cases, user image 238A may include an image of secret code 237A, making it unnecessary for verification information 233A to include separate image of secret code 237B. Verification information 233B may include parallel information from the perspective of computing device 211B.

Computing system 281 may compare the images of the secret codes captured by computing devices 211A and 211B. For instance, still referring to FIG. 2A, communication unit 285 of computing system 281 detects a series of signals over network 105. Communication unit 285 outputs information about the signals to identity module 291. Identity module 291 determines that the signals include verification information 233A from computing device 211A. Identity module 291 further determines that the signals include verification information 233B from computing device 211B. Identity module 291 attempts to verify that the captured image of secret code 237B, which is included within verification information 233A received from computing device 211A, matches the secret code 237B that was previously sent to computing device 211B (as part of code information 232B). Similarly, identity module 291 attempts to verify that the captured image of secret code 237A, which is included within verification information 233B received from computing device 211B, matches the secret code 237A that was previously sent to computing device 211A (as part of code information 232A).

Computing system 281 may verify that the secret codes captured by computing devices 211A and 211B are consistent. For instance, again referring to the example being described with reference to FIG. 2A, identity module 291 determines that the image of secret code 237B captured by computing device 211A is consistent with the secret code 237B that computing system 281 sent to computing device 211B. Further, identity module 291 determines that the image of secret code 237A captured by 211B is consistent with the secret code 237A that computing system 281 sent to computing device 211A. Accordingly, identity module 291 determines that the captured images of secret codes 237A and 237B are consistent with the identity of user 110A and user 110B being verified. If, however, identity module 291 cannot verify that the captured images are the correct images, identity module 291 may conclude that it cannot verify the identity of at least one of users 110A or 110B.

Computing system 281 may also perform facial recognition analysis on the images of users 110A and 110B captured by computing devices 211A and 211B. For instance, identity module 291 may determine that each of verification information 233A and 233B includes a facial image of user 110B and 110A, respectively. Identity module 291 may perform a facial recognition analysis on the image of user 110B included within user image 238A included in verification information 233A in an attempt to verify that user 110B is the user holding computing device 211B. Similarly, identity module 291 may perform a facial recognition analysis on the image of user 110A included within verification information 233B in verification information 233B in an attempt to verify that user 110A is the user holding computing device 211A. To perform such facial recognition analyses, identity module 291 may access information (e.g., within data store 299) sufficient to accurately identify users 110A and 110B based on a captured image of each user's face. In some examples, such information may include historical images of each of users 110A and 110B taken during prior identity verification processes or at other times. Identity module 291 may determine that the facial images of both users 110A and 110B are consistent with prior images, and therefore, the images are consistent with the identity of both users 110A and 110B being verified. However, if identity module 291 is unable to determine that the facial images of one or both of users 110A and 110B are consistent with prior images, identity module 291 may conclude that it cannot verify the identity of at least one of users 110A or 110B.

Computing system 281 may also use information included within verification information 233A and/or verification information 233B to verify that computing devices 211A and 211B are near each other. For instance, identity module 291 may determine that verification information 233A and/or verification information 233B includes proximity information 236. As described above, proximity information 236 may be included within request 231A and/or request 231B, and in such an example, computing system 281 may have previously concluded that computing devices 211A and 211B are sufficiently near each other. However, in other examples, such as where requests 231A and 231B do not include proximity information 236, verification information 233 may include proximity information 236, thereby enabling computing system 281 to make a determination about whether computing devices 211A and 211B are sufficient near each other. In still other examples, even where one or both of requests 231A and 231B do include proximity information, verification information 233 may include additional proximity information 236, thereby enabling computing system 281 to confirm that computing devices 211A and 211B are near each other.

Computing system 281 may inform users 110A and 110B that the identity verification procedure was successful. For instance, if identity module 291 is able to verify the captured images of secret codes 237A and secret code 237B and the captured facial images of users 110A and 110B, and is further able to determine that computing devices 211A and 211B are near each other, identity module 291 may conclude that it can verify the identity of users 110A and user 110B.

In such an example, identity module 291 causes communication units 285 to output signals over network 105 destined for computing devices 211A and 211B. Computing device 211A detects a signal over network 105 which identity module 222A of computing device 211A determines corresponds to information sufficient to present a user interface. Identity module 222A causes a display (e.g., one of output devices 217A) to present a user interface informing user 110A that the verification process was successful. Similarly, computing device 211B detects a signal over network 105 which identity module 222B of computing device 211B determines corresponds to information sufficient to present a user interface. Identity module 222B causes a display (e.g., one of output devices 217B) to present a user interface informing user 110B that the verification process was successful. In other examples, however secret code 237A may be presented in another way, such as by output device 217A outputting an audio signal or a light pattern.

Computing system 281 may update consensus networks 150 to reflect the results of the verification process. For instance, again referring to FIG. 2A, identity module 291 outputs information, to ledger module 292, about the results of the mutual verification process performed by users 110A and 110B. Ledger module 292 causes communication unit 285 to output a series of signals over network 105. At least one of nodes 151 on consensus network 150 receives the signals and determines that the signals correspond to a request to update distributed ledger 159 maintained by consensus network 150. At least one of the nodes 151, such as node 151A, communicates with other nodes 151 on consensus network 150 pursuant to a consensus protocol. Node 151A causes (or initiates a process that causes) nodes 151 to reach consensus about proposed updates to distributed ledger 159. Eventually, nodes 151 within consensus network 150 update distributed ledger 159 to include information about the mutual verification procedure performed by user 110A and user 110B. In the example being described, the mutual verification procedure was assumed to be completed successfully, with both users 110A and 110B being able to verify their identities. In such a situation, distributed ledger 159 is updated to reflect that user 110A and user 110B has successfully completed a mutual verification procedure. In some examples, this may increase the status on the network of one or both of users 110A and 110B. However, in other examples, the mutual verification procedure might not have been completed successfully, with either or both of users 110A and 110B being unable to verify their identities in a satisfactory way. In that situation, distributed ledger 159 would be updated to reflect that the mutual verification between users 110A and 110B was unsuccessful, which may decrease the status on the network of one or both of users 110A or 110B.

One or more examples described herein with reference to FIG. 2A have been described in terms of computing system 281 performing various operations, some of which involve computing system 281 causing nodes 151 to update distributed ledger 159 of consensus network 150. In other examples, however, some or all of such operations may be performed by one or more nodes 151 of consensus network 150. Accordingly, some or all of the operations described herein as being performed by computing system 281 may be performed directly by one or more of nodes 151, such as by one or more smart contracts executing on such nodes 151.

Modules illustrated in FIG. 2A (e.g., authentication module 221, identity module 222, identity module 291, ledger module 292, and/or transaction module 293) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3:
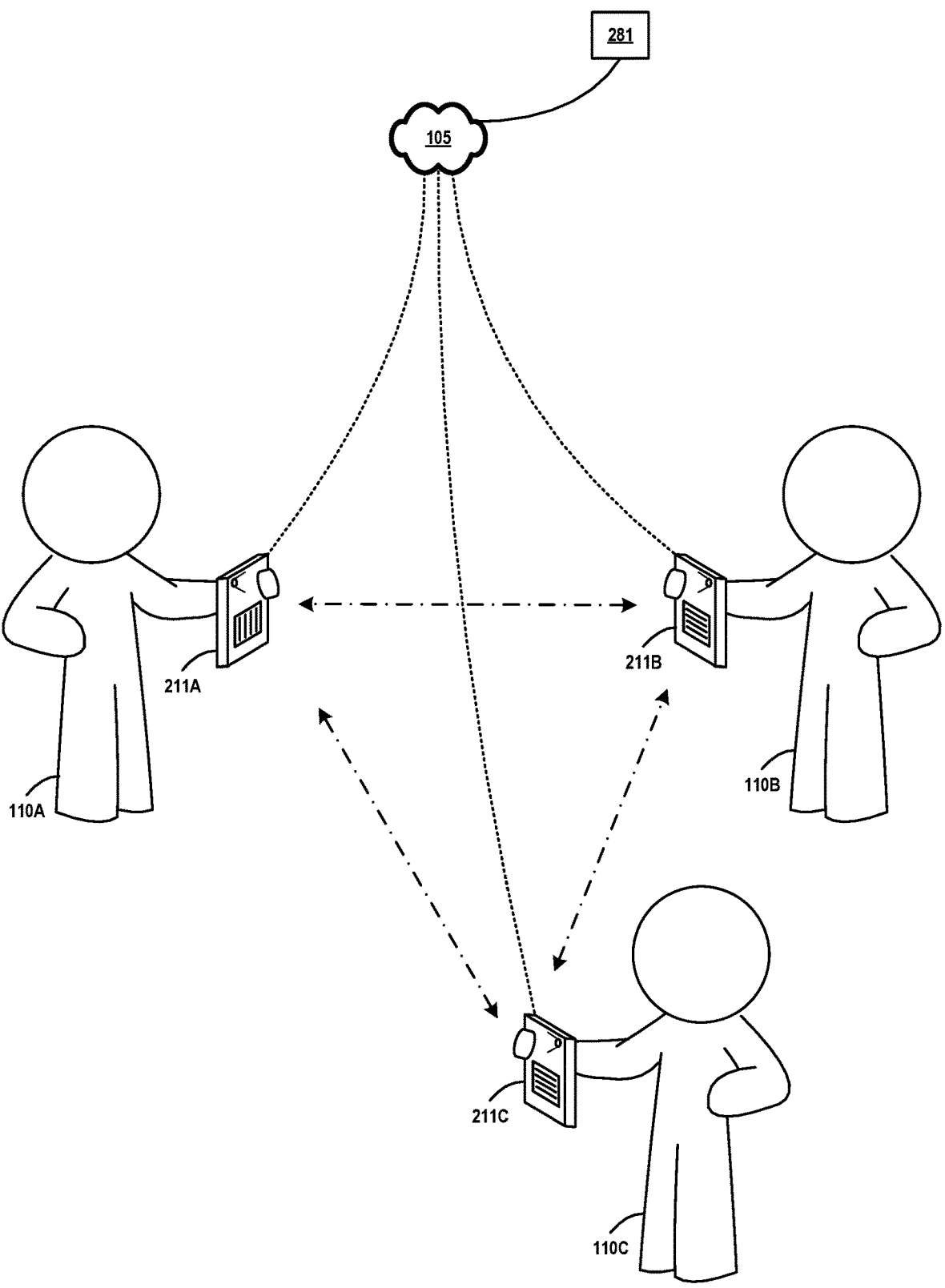
FIG. 3 is a conceptual diagram illustrating an example system in which three users perform a mutual identity verification, in accordance with one or more aspects of the present disclosure.

FIG. 3 is a conceptual diagram illustrating an example system in which three users perform a mutual identity verification, in accordance with one or more aspects of the present disclosure. FIG. 3 illustrates a process involving three user users 110A, 110B, and 110C, each operating a computing device 211 (computing devices 211A, 211B, and 211C operated by users 110A, 110B, and 110C, respectively). Each of computing devices 211 may be configured to communicate with each other directly (e.g., through Bluetooth, near-field communication, through audio signals, or otherwise). In addition, each of computing devices 211 may communicate with computing system 281 over network 105. Computing system 281 may correspond to computing system 281 of FIG. 2A (or network management computing system 181 of FIG. 1).

The process illustrated in FIG. 3 may be similar to that described in connection with FIG. 1 and/or FIG. 2A, where each of users 110 seeks to perform an identity verification by interacting with other users. While FIG. 1 and FIG. 2A illustrate two users engaging in mutual identity verification, FIG. 3 illustrates that such a process can apply to more than two users, and in general, could involve any practical number of users.

In an example that can be described in the context of FIG. 3, and in accordance with one or more aspects of the present disclosure, each of computing devices 211 may initiate an identity verification process. For instance, computing device 211A detects input that it determines corresponds to a request (e.g., by user 110A) to perform a mutual verification with users 110B and 110C. At around the same time, computing device 211B detects input that it determines corresponds to a request (e.g., by user 110B) to perform a mutual verification with users 110A and 110C. Similarly, computing device 211C detects input that it determines corresponds to a request (e.g., by user 110C) to perform a mutual verification with users 110A and 110B. In some examples, such input may be detected by a dedicated identity module 222 executing on each of computing devices 211 (e.g., see FIG. 2A). In other examples, such input may be detected by another application that also performs other functions (e.g., a banking application executing on each computing device 211).

One or more of computing devices 211 may collect proximity information. For instance, referring to the example being described in the context of FIG. 3, computing device 211A outputs an audio signal. Computing device 211B or computing devices 211C, or both, may detect an audio signal and store information about the audio signal. Each of computing devices 211B and 211C may also output an audio signal, which may be detected by the other computing devices 211. Each of computing devices 211 that do detect an audio signal store information about the signal that can be used as proximity information 236, as described in connection with FIG. 2A and FIG. 2B. Alternatively, or in addition, computing devices 211 may communicate in other ways to generate proximity information (e.g., sharing Bluetooth certificates, physical interactions, bumping).

Each of computing devices 211 may separately communicate with computing system 281 (or a consensus network on which computing system 281 serves as a node). For instance, referring again to the example being described in the context of FIG. 3, each of computing devices 211A, 211B, and 211C output a request to computing system 281 over network 105. Computing system 281 detects the requests and evaluates them for consistency, such as by confirming that the three computing devices 211 all seek to perform a verification with the same three users 110. In some examples, such an evaluation involves evaluating any proximity information received in the requests and determining whether the proximity information can be used to confirm that computing devices 211A, 211B, and 211C are physically near each other.

Computing system 281 may respond to each of the requests with a code. For instance, still with reference to FIG. 3, if computing system 281 determines that requests received from computing devices 211 are consistent, computing system 281 generates a different secret code for each of computing devices 211A, 211B, and 211C and outputs each code to a respective computing device 211. In some examples, this code-generating operation could be performed by computing system 281 or by a node on a consensus network executing a smart contract that administers the mutual verification process.

Computing devices 211 may use the codes to capture an image that can be used for verification. For instance, in the example being described, each computing device 211 receives one of the codes generated by computing system 281. Each of computing devices 211 prompts its user to hold the computing device in a way that shows the image, video, or other manifestation the secret code to the other users 110, such as in the manner shown in FIG. 3. Each of computing devices 211 captures an image or set of images of the other two users 110 holding their respective computing devices 211, each presenting their respective secret code. Each of computing devices 211 sends the captured image or set of images to computing systems 281 over network 105.

Computing system 281 uses the captured images to determine whether the identity of each of users 110 can be successfully verified. For instance, computing system 281 evaluates the images captured by computing devices 211 to confirm that the images are consistent with users 110A, 110B, and 110C properly verifying each other's identity. In some examples, such an evaluation may involve determining whether the images received from computing devices 211 each show a representation of the correct secret codes (e.g., the image received from computing device 211A should have captured the secret codes that computing system 281 sent to computing devices 211B and 211C). Similarly, such an evaluation may also involve determining whether the images received from computing devices 211 each show a representation of the correct user (e.g., the image received from computing device 211A should have captured a picture of users 110B and 110C). Computing system 281 may perform facial recognition to determine whether the correct users appear in each image. Based on these evaluations, computing system 281 may determine whether the users have successfully performed a mutual verification of each other. Computing system 281 may update a blockchain or a ledger maintained by a consensus network with the results of such a determination.

Although the example illustrated in FIG. 3 involves three users, more than three users can be verified using a similar process. For example, for a larger group of "N" users, each of the images captured by computing devices 211 would include images of N users (and N secret codes). If the images captured by each of computing devices 211 in such an example are of sufficiently high resolution to enable recognition of the N secret codes and facial recognition analysis for each of the users within the images, a mutual identity verification process may be feasible for N users. Alternatively, multiple images could be captured by each of computing devices 211, where each image captures only a subset of the N users, and a similar process for verification could be performed on each image individually. In such an example, the mutual verification process may still be performed for all of the users collectively.

Figure 4A:
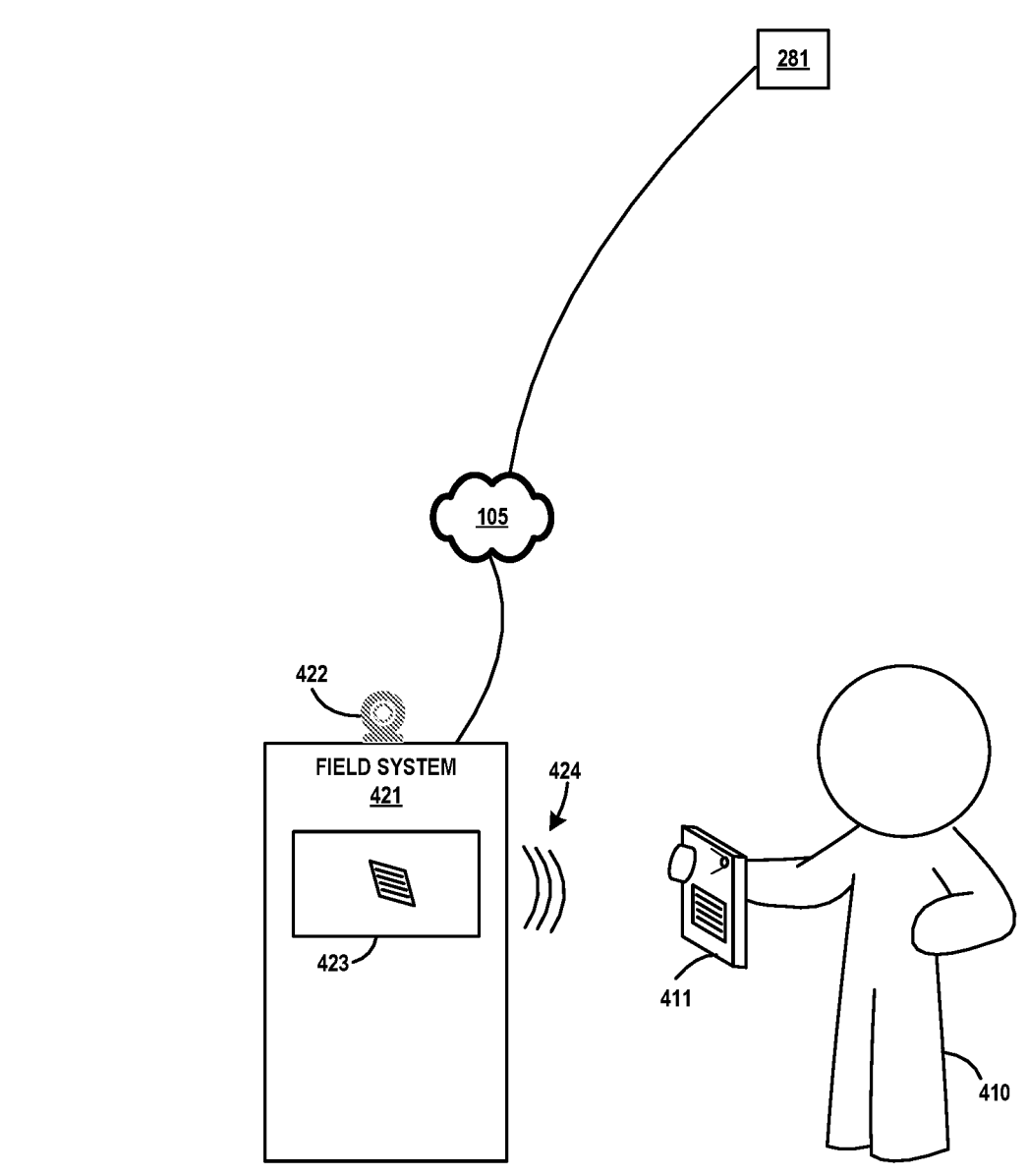
FIG. 4A is a conceptual diagram illustrating an example system in which a user interacts with a physical device to perform an identity verification, in accordance with one or more aspects of the present disclosure.

FIG. 4A is a conceptual diagram illustrating an example system in which a user interacts with a physical device to perform an identity verification, in accordance with one or more aspects of the present disclosure. FIG. 4A illustrates system 400A that includes a physical device or field system 421, which may be, in some examples, an automated teller machine administered by a bank, financial institution, or other organization (e.g., network administrator 180 of FIG. 1). Field system 421 may include various input and output devices, including camera 422, display 423, and/or an audio device (not specifically shown). Field system 421 may interact with computing system 281 over network 105. Computing system 281 may correspond to computing system 281 of FIG. 2A. User computing device 411, operated by user 410, may interact with field system 421 in order to perform an identity verification. As described herein, the process for performing the identity verification with field system 421 may parallel, in some respects, the mutual verification performed by users 110 in FIG. 1 and/or FIG. 2A.

For example, computing system 281 of FIG. 4A may determine that user computing device 411 is initiating an identity verification at the site of field system 421. For instance, in one such example, user computing device 411 detects input that it determines corresponds to a request, by user 410, to perform an identity verification. User computing device 411 outputs a signal over network 105. Computing system 281 detects a signal over network 105 and determines that the signal corresponds to a request, by an authenticated user of user computing device 411, to perform an identity verification. Computing system 281 further determines that the request identifies the location of user computing device 411 and/or a specific field system 421 near user computing device 411. In response, computing system 281 output signals to user computing device 411 and field system 421.

Computing system 281 may perform a proximity assessment to confirm that user computing device 411 is near field system 421. For instance, continuing with the example being described in the context of FIG. 4A, field system 421 receives a signal from computing system 281 (over network 105) and determines that the signal corresponds to a request to perform a proximity assessment with respect to user computing device 411. To perform the proximity assessment, field system 421 initiates a procedure to determine whether user computing device 411 is near field system 421. Such a procedure may involve outputting an audio signal (i.e., resulting in sound waves 424) that may be detected by user computing device 411. User computing device 411 uses the detected audio signal to generate proximity information. User computing device 411 communicates the proximity information to computing system 281 over network 105. Computing system 281 evaluates the proximity information to determine whether user computing device 411 is sufficiently near field system 421. In some examples, user computing device 411 may also output an audio signal that field system 421 may use to generate proximity information. In other examples, field system 421 and/or user computing device 411 may perform a proximity assessment through an exchange of Bluetooth certificates or other information, physical interactions between user computing device 411 and field system 421 (e.g., bumping), or through other processes.

Each of field system 421 and user computing device 411 may capture an image. Field system 421 also determines that the signal received from computing system 281 (or another signal received from computing system 281) includes code information. Field system 421 derives a code from the code information and displays the code on display 423. User computing device 411 captures one or more images of the code (e.g., using a camera associated with user computing device 411). Similarly, user computing device 411 determines that the signal that it received from computing system 281 also includes code information. User computing device 411 derives a code from the code information and presents the code on a display associated with user computing device 411. Field system 421 captures an image of the code presented by user computing device 411.

Each of user computing device 411 and field system 421 communicate information about the captured images over network 105. Computing system 281 receives the communicated information and evaluates whether the proximity information and the images of the captured codes are consistent with user 410 being present near field system 421 for an identity verification. Computing system 281 may also perform facial recognition on the image captured by camera 422 of field system 421 to verify that the user holding user computing device 411 is actually user 410. Computing system 281 may also evaluate the image captured by the camera included in user computing device 411 to determine whether field system 421 is shown within the image. In some examples, field system 421 may have a specific shape or markings that can be used to uniquely identify field system 421 and distinguish the system from other similar field systems 421 that may also be deployed for use as an automated teller machine or identity verification device. Once the evaluation and analyses are complete, computing system 281 may output a notification to field system 421, to user computing device 411, or both informing the user of the results of the verification process. In some examples, computing system 281 may update a consensus network to memorialize the results of the identity verification process.

Figure 4B:
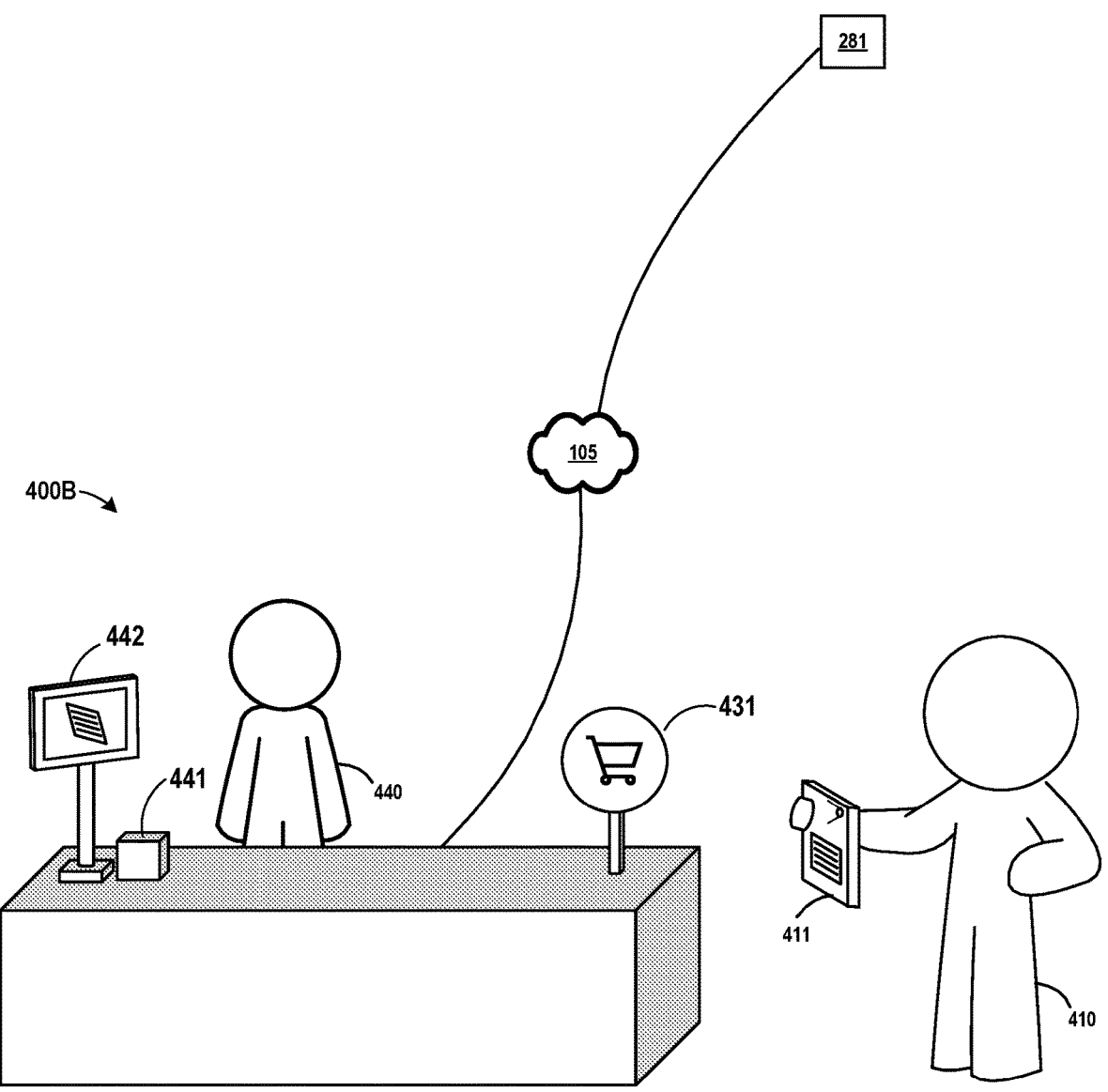
FIG. 4B illustrates a conceptual diagram illustrating an example system in which a verification operation is performed at a point-of-sale location, in accordance with one or more aspects of the present disclosure.

FIG. 4B illustrates a conceptual diagram illustrating an example system in which a verification operation is performed at a point-of-sale location, in accordance with one or more aspects of the present disclosure. FIG. 4B illustrates system 400B, which includes point of sale device 431, merchant computing device 441, and display 442. System 400B may be at a point-of-sale location of a merchant or other organization, which may be staffed by merchant representative 440. User computing device 411, operated by user 410, may interact with point-of-sale device 431 or other devices of system 400B. Each of the devices within system 400B may communicate with computing system 281 over network 105. As in FIG. 4A, computing system 281 may correspond to computing system 281 of FIG. 2A.

In some examples, system 400B may perform dual purposes: acting as a physical point of sale for the purchase of goods or services, and performing an identity verification in connection with such a purchase. User 410 will often not personally know merchant representative 440, so performing a mutual identity verification at a point of sale, such as is described in connection with FIG. 2A and FIG. 3, might not be appropriate. However, user 410 may nevertheless be able to perform an identity verification, as in FIG. 4A, with system 400B acting in a manner similar to field system 421 of FIG. 4A. To the extent that point-of-sale locations are equipped with networking equipment, audio devices, and/or cameras, such point-of-sale locations may therefore be able to serve as locations at which users 410 may perform an identity verification, using a process similar to that described in FIG. 4A.

Performing an identity verification at a point of sale location may have particular advantages. For example, users may view a point of sale location as a convenient place to perform an identity verification, since historically, activities performed at point of sale locations are at least roughly similar to those performed when performing an identity verification (e.g., interacting with merchant representative 440, interacting with a mobile device or user computing device 411, presenting payment information). Users 410 may therefore view performing identity verifications as convenient, which may encourage more frequent identity verifications. Also, a point-of-sale location may be an appropriate and secure location for the equipment used to perform an identity verification (e.g., audio devices, cameras, networking connectivity, Near Field Communication capability, etc.).

FIG. 5 is a flow diagram illustrating operations performed by an example computing system in accordance with one or more aspects of the present disclosure. FIG. 5 is described below within the context of computing system 281 of FIG. 2A. In other examples, operations described in FIG. 5 may be performed by one or more other components, modules, systems, or devices. Further, in other examples, operations described in connection with FIG. 5 may be merged, performed in a different sequence, omitted, or may encompass additional operations not specifically illustrated or described.

In the process illustrated in FIG. 5, and in accordance with one or more aspects of the present disclosure, computing system 281 may receive a request to perform an identity verification for a requesting user that operating the requesting device (501). For example, with reference to FIG. 2A, computing device 211A (i.e., the "requesting device") detects input that it determines corresponds a request to perform a mutual identity verification with user 110B. Computing device 211A outputs a signal over network 105. Computing system 281 detects the signal and determines that that the request corresponds to a request, by user 110A (i.e., the "requesting user"), to perform a mutual identity verification. In some examples, the request includes information about user 110A, information about the user of computing device 211B (e.g., user 110B), information about the location of computing device 211A, and/or information about the proximity of computing device 211A and computing device 211B.

Computing system 281 may output, to the requesting device, code information (502). For example, again referring to FIG. 2A, computing system 281 outputs a signal over network 105. Computing device 211A detects the signal and determines that the signal includes code information.

Computing system 281 may enable the requesting device to display a code derived from the code information (503). For example, computing device 211A of FIG. 2A further determines that the signal received from computing system 281 includes a code (e.g., an image, a computer-readable code, a quick response or "QR" code, a passcode, a video sequence or animation, or any other appropriate code). Computing device 211A presents the code on a display included within computing device 211A.

Computing system 281 may receive, from a verification device, an image of another device (504). For example, again as illustrated in FIG. 2A, computing device 211B (i.e., the "verification device") captures an image of computing device 211A while user 110A is holding computing device 211A and computing device 211A is presenting the code. Computing device 211B outputs a signal over network 105. Computing system 281 detects the signal and determines that the signal includes an image of user 110A holding computing device 211A (the "other device").

Computing system 281 may determine, based on the image of the other device, whether the other device is the requesting device (505). For example, computing system 281 analyzes the image received from computing device 211B and determines whether the image includes the code that was sent to computing device 211A for display by computing device 211A. If the image includes the code, computing system 281 may determine that the other device included in the image is the requesting device (i.e., computing device 211A operated by user 110A). If the computing system 281 determines that the other device is the requesting device, computing system 281 may also determine that the other device (i.e., computing device 211A) is being operated by the requesting user (i.e., user 110A). To make such a determination, computing system 281 may perform facial recognition on the image. If the facial recognition analysis is consistent with the user in the image being user 110A, computing system 281 may verify the requesting user (507 and YES path from 506). If computing system 281 determines that the other device is not the requesting device (or the user in the image is not user 110A), computing system 281 may determine that the other device (i.e., computing device 211A) is not being operated by the requesting user (i.e., user 110A), and may therefore decline to verify the requesting user (508 and NO path from 506).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The disclosures of all publications, patents, and patent applications referred to herein are hereby incorporated by reference. To the extent that any such disclosure material that is incorporated by reference conflicts with the present disclosure, the present disclosure shall control.

For ease of illustration, a limited number of devices or systems (e.g., simulator 150, agent 112, computing system 200, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/ or firmware.

What is claimed is:

1. A computing system comprising a storage device and processing circuitry having access to the storage device, wherein the processing circuitry is configured to:
    receive, from a requesting device, a request to perform an identity verification for a requesting user that is operating the requesting device;
    output, to the requesting device, code information;
    enable the requesting device to display a code derived from the code information;
    receive, from a verification device operated by a verification user having personal knowledge of an identity associated with the requesting user, an image of a pictured device; and
    determine, based on the image of the pictured device, whether the pictured device is the requesting device.

2. The computing system of claim 1, wherein the processing circuitry is further configured to:
    receive proximity information indicating whether the verification device is near the requesting device.

3. The computing system of claim 2, wherein to receive proximity information, the processing circuitry is further configured to:
    receive, from both the requesting device and the verification device, proximity information.

4. The computing system of claim 3, wherein to determine whether the pictured device is the requesting device, the processing circuitry is further configured to:
    determine, based on the proximity information, whether the verification device is near the requesting device.

5. The computing system of claim 1, wherein to determine whether the pictured device is the requesting device, the processing circuitry is further configured to:

determine whether the image of the pictured device includes an image of the code being displayed by the pictured device.

6. The computing system of claim 1, wherein the processing circuitry is further configured to:
    determine whether the pictured device is being operated by the requesting user.

7. The computing system of claim 6, wherein to determine whether the pictured device is being operated by the requesting user, the processing circuitry is further configured to:
    identify the requesting user in the image of the pictured device.

8. The computing system of claim 7, wherein to identify the requesting user in the image of the pictured device, the processing circuitry is further configured to:
    perform facial recognition analysis on the image of the pictured device.

9. The computing system of claim 6, wherein the pictured device is operated by an operator, and wherein processing circuitry is further configured to:
    receive, from the verification device and based on input detected by the verification device, an indication of identity about the operator.

10. The computing system of claim 9, wherein to determine whether the pictured device is being operated by the requesting user, the processing circuitry is further configured to:
    determine, based on the indication of identity about the operator, whether the operator is the requesting user.

11. A method comprising:
    receiving, by a computing system and from a requesting device, a request to perform an identity verification for a requesting user that is operating the requesting device;
    outputting, by the computing system and to the requesting device, code information;
    enabling, by the computing system, the requesting device to display a code derived from the code information;
    receiving, by the computing system and from a verification device operated by a verification user having personal knowledge of an identity associated with the requesting user, an image of a pictured device; and
    determining, by the computing system and based on the image of the pictured device, whether the pictured device is the requesting device.

12. The method of claim 11, further comprising:
    receiving, by the computing system, proximity information indicating whether the verification device is near the requesting device.

13. The method of claim 12, wherein receiving proximity information includes:
    receiving, from both the requesting device and the verification device, proximity information.

14. The method of claim 13, wherein determining whether the pictured device is the requesting device includes:
    determining, based on the proximity information, whether the verification device is near the requesting device.

15. The method of claim 11, wherein determining whether the pictured device is the requesting device includes:
    determining whether the image of the pictured device includes an image of the code being displayed by the pictured device.

16. The method of claim 11, further comprising:
    determining, by the computing system, whether the pictured device is being operated by the requesting user.

17. The method of claim 16, wherein determining whether the pictured device is being operated by the requesting user includes:

identifying the requesting user in the image of the pictured device.

18. The method of claim 17, wherein identifying the requesting user in the image of the pictured device includes:

performing facial recognition analysis on the image of the pictured device.

19. The method of claim 16, wherein the pictured device is operated by an operator, the method further comprising:

receiving, by the computing system from the verification device and based on input detected by the verification device, an indication of identity about the operator.

20. A non-transitory computer-readable medium comprising instructions that, when executed, configure processing circuitry of a computing system to:

receive, from a requesting device, a request to perform an identity verification for a requesting user that is operating the requesting device;

output, to the requesting device, code information;

enable the requesting device to display a code derived from the code information;

receive, from a verification device operated by a verification user having personal knowledge of an identity associated with the requesting user, an image of a pictured device; and determine, based on the image of the pictured device, whether the pictured device is the requesting device.

\* \* \* \* \*